Jan. 13, 1931. E. F. DELÉRY 1,788,383
FLUID FILTER AND THE LIKE
Filed June 26, 1925 2 Sheets-Sheet 1
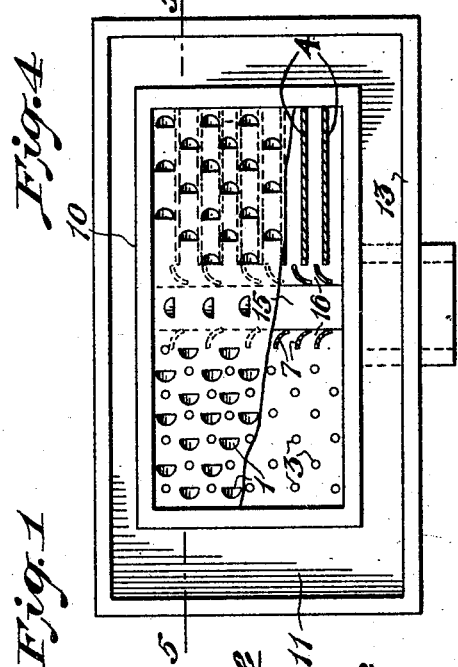
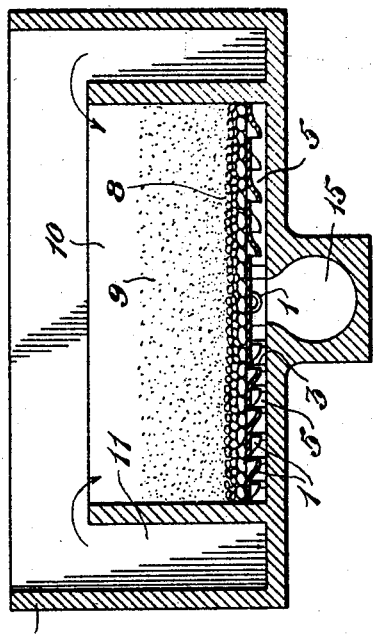
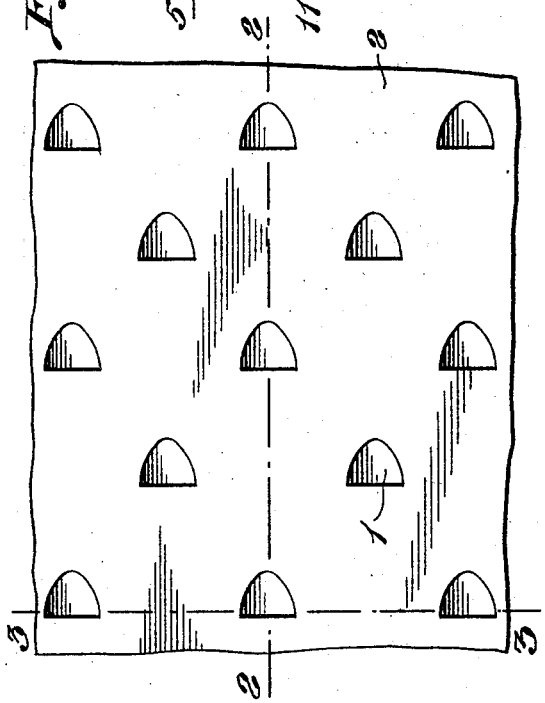
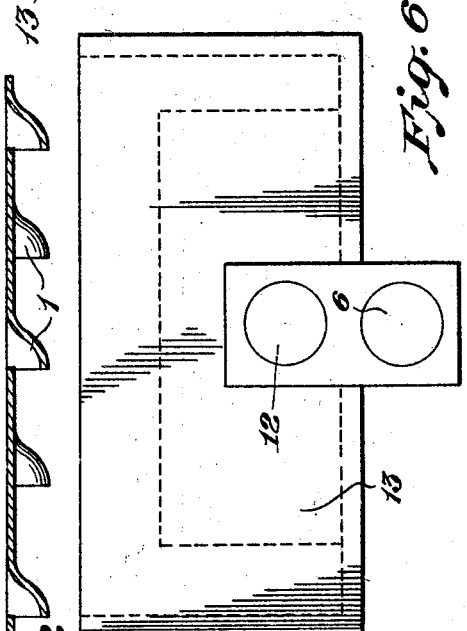
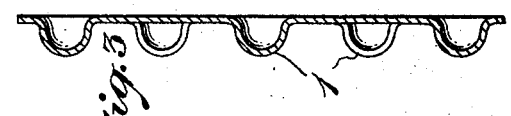
Inventor
Eugene Frank Deléry

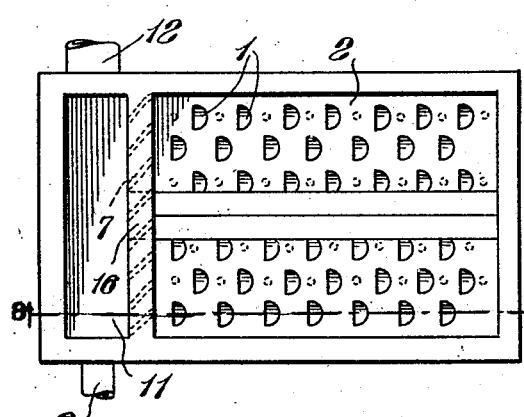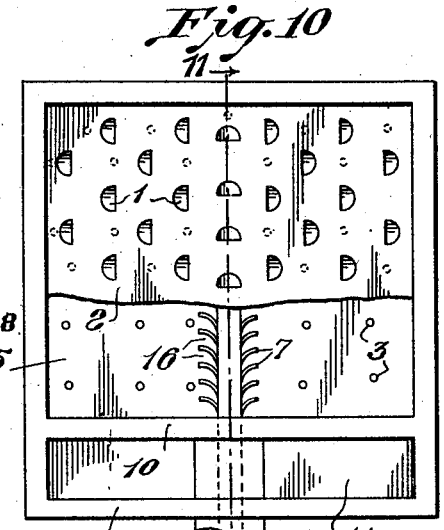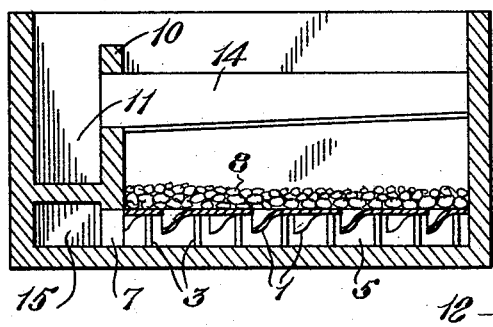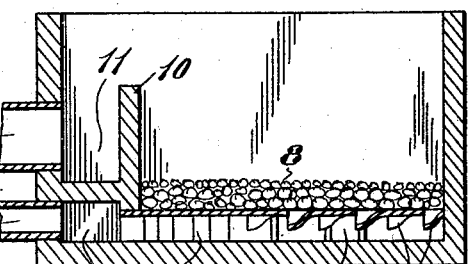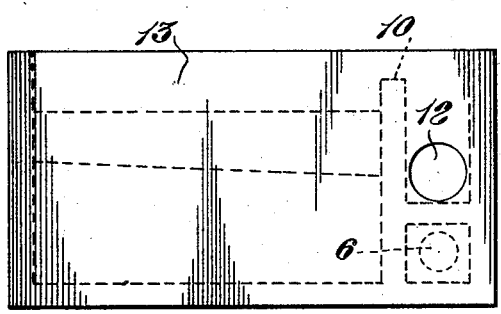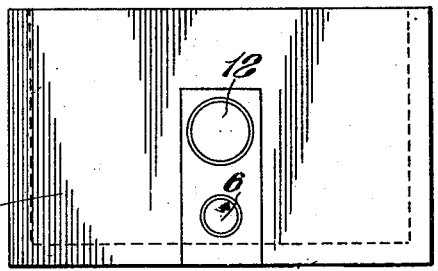

Patented Jan. 13, 1931

1,788,383

UNITED STATES PATENT OFFICE

EUGENE FRANK DELÉRY, OF NEW ORLEANS, LOUISIANA; EDNA FUSELIER DELÉRY, TUTRIX, ADMINISTERING THE ESTATE OF SAID EUGENE FRANK DELÉRY, DECEASED

FLUID FILTER AND THE LIKE

Application filed June 26, 1925. Serial No. 39,867.

This invention relates to fluid filtering machines wherein a filtering medium, a screening element and an expansion chamber are combined to form a filter.

The principal object of the invention is to provide means whereby the fluid is evenly distributed both in filtering and in washing over the entire bed of the filter and guided in the correct direction of flow, so as to take advantage of the maximum part of the velocity head in the fluid, of the whole filter bed for filtering and washing purposes, secure a uniform distribution of wash flow and simplify construction and repair.

The invention consists in means whereby the fluid passes through orifices directed in the direction of flow and depressed in a substantially horizontal screen, beneath the filtering medium, registering with an expansion chamber beneath the screen. The screen is supported in a suitable manner from the floor of the expansion chamber on short columns. The expansion chamber registering with the discharge passage through curved passages in the direction of flow. The screen beneath the filtering medium covers the whole filter bottom and makes it completely available.

It also consists in a filter box registering with the supply passage around its whole periphery, and in the several combinations and parts defined in the appended claims, and particularly set forth in the ensuing description and illustrated in the accompanying drawings.

In the drawings in which like reference characters indicate like parts throughout the several views:

Figure 1 is an enlarged view in plan of a part of the typical screen;

Figure 2 is a section through Fig. 1 on the line 2—2;

Figure 3 is an elevation of Fig. 1 on the line 3—3;

Figure 4 is a plan view of a filter with the filter box arranged to take fluid around its whole periphery, and shows the screen partially cut away to show the screen supports and the directing vanes and central discharge passage.

Figure 5 is a section through Figure 4 on the line 5—5.

Figure 6 is an end elevation of Figure 4.

Figure 7 is a plan view of this invention applied to a filter with an end supply passage and wash water gutters of a very usual type.

Figure 8 is a section through Figure 7 on the line 8—8.

Figure 9 is an elevation of Figure 7.

Figure 10 is a plan of a filter with an end supply channel and a central discharge channel.

Figure 11 shows a section through Figure 10; on 11—11.

Figure 12 is an elevation of Figure 10.

In all views the invention is shown embodied in a filter of the type usually designated as "rapids and filter" but is not to be understood as being limited to this type by the particular embodiments disclosed for the purpose of illustrating the practical application thereof.

In the drawings 1 designates the depressed orifices, 2 the body of the screen in which 1 is depressed. This is the important part of this invention and will be specially claimed.

3 indicates supports for holding the screen above the bottom of the expansion chamber; 4 a longitudinal form of screen support; 5, the expansion chamber beneath the screen; 6, the discharge pipe; 7, the curved vanes between the chamber 5 and the discharge passage 15; 8, the lower coarse filtering medium (usually graded gravel) and 9 the fine top filtering medium (usually sand) ; 10, the wall over which the fluid flows to the filter; 11, the supply passage; 12, the exterior supply pipe; 13, the exterior wall of the supply passage; 14, the wash-water gutter in that type of filter; 15, the wash-water supply passage beneath the screen; and 16, the curved passages between the vanes 7.

It will be observed, in Figures 4 and 10, that the screen 2 has been partially cut away to show the vanes 7, passages 16 and 15 and the supports 3. It will be observed in all figures that the screen is placed altogether beneath the filtering media 8 and 9 and that, in all cases whether filtering or washing by reversed flow, the orifices both receive and discharge the fluid in the direction of flow. This is an important point of this invention.

It will be observed in all figures that in all cases the screen is placed intermediate of the filtering medium and the expansion chamber (and discharge passage, when the discharge passage is beneath the screen) with the orifices 1 protruding into the expansion chamber.

In Figure 1 by arranging the walls 10 so that fluid may pass over 10 all around the filter it is believed that a great improvement over the usual types of filters has been made, by reducing the distance of travel of the fluid and neutralizing the direction of travel above the filter medium.

In operation the screen is so placed in the filter that when filtering or when the flow is reversed to wash the filter, the orifice openings face the flow of the entering fluid and direct it in the direction in which it is discharged.

In filtering the fluid enters through the exterior supply pipe to the supply passage 11, flows over the wall 10, filters through the filtering media 8 and 9 thence through the screen 2 by way of the depressed orifices 1 to the chamber 5 in the direction of the passages 16, through these to the discharge passage 15 in the direction of flow in this passage, with a minimum loss of head and out at the discharge pipe 6.

To wash the operation is reversed, the fluid enters through 6 to 15 to 16 to 5 to 1 to 8 to 9 over 10 to 11 and out 12 to the drain, meeting the orifices 1 and discharging from them in the normal direction of flow.

Another improvement over the usual type is shown in having the filtering media above the screen where it can be renewed and cleaned without removing the screen, and where its weight tends to hold down the screen during washing, without the necessity of bolts or other fastenings. It may be freely supported on the supports 3 if so desired.

It is not claimed that a filter using a filtering medium, and a perforated screen, washed by reversing the flow is new, nor that the use of a perforated screen is new, nor that the use of a screen extending over the whole filter bottom is new, but having described my invention, I claim:

The combination of a filter bed, a perforated supporting plate for said bed, an expansion chamber below said plate, the plate having water directing members extending downwardly from said perforations into the expansion chamber and opening laterally to receive and direct wash water from below into the filter bed.

EUGENE F. DELÉRY.